UNITED STATES PATENT OFFICE.

CARL HERMANN VON HOESSLE, OF RADEBEUL, NEAR DRESDEN, GERMANY, ASSIGNOR TO CHEMISCHE FABRIK VON HEYDEN, AKTIENGESELLSCHAFT, OF RADEBEUL, GERMANY.

PROCESS OF MIRRORING GLASS OR LIKE SURFACES.

No. 906,229.  Specification of Letters Patent.  Patented Dec. 8, 1908.

Application filed July 14, 1908. Serial No. 443,565.

*To all whom it may concern:*

Be it known that I, CARL HERMANN V. HOESSLE, a subject of the King of Saxony, and resident of Sedanstrasse 22, Radebeul, near Dresden, Saxony, German Empire, have invented a new and useful Improvement in the Process of Mirroring Glass or Like Surfaces, of which the following is a specification.

The numerous known processes of mirroring by silver are based on the fact that metallic silver is precipitated on the surface to be mirrored from an alkaline solution of nitrate of silver in distilled water by means of suitable reducing means. All known processes have disadvantages and require precautions so that only the man highly skilled in the art will be able to manufacture faultless mirrors. Such precautions are not necessary with the process forming the object of the present invention, in as much as it is so simple that even a man not experienced is able to manufacture mirrors by it. The devices necessary for performing the new mirroring-process are also far simpler. Up to the present it was necessary, in case the mirror layer or skin was damaged or destroyed, to sometimes again grind the plate to be newly mirrored. Such manipulations are not necessary with the new process forming the object of the present invention. Furthermore the known reducing processes show also the great disadvantage that the silver solution because of already containing the reducing substances, permanently precipitate silver and are reduced already in the liquid-vessels, whereby the precipitated silver is only partly used for forming the mirror, whereas the silver not precipitated as a mirror must permanently be worked up again to form nitrates of silver. It has been tried to obviate these drawbacks by separately sprinkling a silver solution and a reducing solution kept apart from each other, by means of two nozzles; however such process is accompanied by other difficulties and is therefore not in use in practice.

Now I have found that all drawbacks of the processes known up to the present can be obviated by not applying, on the surface to be silvered as formerly done, the silver-solution containing all components necessary for the reduction but a silver-solution which as such has no mirroring action because of either not containing the reducing substance or the alkaline substance necessary for the reduction and by only separately causing the reduction to silver in a second stage by a special action of these absent substances. So for instance a solution of nitrate of silver in a small quantity of water to which formaldehyde is added, will not have a mirroring effect. A mirror will only be formed when the surfaces coated with such a solution are exposed to the action of alkaline reagents as for instance to ammonia. Or on the other hand the solution in ammonia of oxid of silver will not have a mirroring effect; the mirror will only be formed when the surface coated with such ammonia compound is exposed to the action of formaldehyde vapors.

The essential feature of the present invention consists in that the applying of the silver solution and the reduction takes place in two consecutive stages, whereas, up to the present, the solution reducing *per se* was brought to its action in one procedure.

Example: 6 parts by weight (6 grams) of nitrate of silver are dissolved in 3 parts by volume (3 cubic centimeters) of distilled water, to which a mixture composed of 6 parts by volume (6 cubic centimeters) of a 40 per cent. solution of formaldehyde and 7 parts (7 cubic centimeters) of glycerin or a highly concentrated sugar-solution, syrup or gum-solution is added.

If necessary a small quantity of acetone is added to secure a good adhering of the liquid to the glass. The solution mentioned can be used either immediately or after diluting it by water. Such dilution depends upon the desired thickness of the layer or skin on the glass. First a small quantity of the solution is applied to the plate and the entire surface is rubbed up by means of a brush or a rubber composed of deerskin; hereafter a larger quantity of the solution is poured on and the surface is slanted in such a manner that the liquid may reach all points of the surface to be mirrored. The plate is hereafter placed vertically so that the superfluous solution may run off. The solution will adhere to the plate in a quantity sufficient to produce a good silver layer or skin on the mirror. The superfluous liquid having run off, the plate is exposed to the action of ammonia by placing this plate within a vessel or a receptacle the bottom of which is covered with vapors of ammonia or by directing ammonia vapors against the plate or by dipping the latter into a solution of ammonia in benzene or another suitable dissolving agent which does not mix with the aqueous solutions and does not wash away the silver-solution applied. The mirror is thus formed nearly instantaneously in distinction from the processes now in use. The mirror is then washed for a short time, dried and varnished. The mentioned substances added, as gum arabic, glycerin etc. have only the purpose to concentrate the liquid or to increase the adhering of the liquid to the surface to be mirrored. Such substances added are preferable but not absolutely necessary. To the silver-solution there may be added substances, for instance salts of lead, which cause certain effects in the color of the mirror, as in use in other mirroring processes.

The process described can be modified by a suitable selection of the reducing-agent, the concentration and the substance added; the formaldehyde may be replaced by other reducing-substances, other reagents of alkaline action may be used instead of ammonia. The process may also be effected in an inverse manner by applying an alkaline silver-solution, for instance a solution in ammonia of oxid of silver, to the surface and by allowing the reducing substance, for instance the vapors of formaldehyde, to act in the second stage. Besides glass, objects consisting of another mass for instance celluloid, mica, hardened gelatin and the like may be mirrored in the manner described.

As explained above, the thickness of the mirror-layer may be varied according to the concentration of the solution; therefore the process described is highly suitable for the manufacture of transparent-mirrors the manufacture of which was accompanied up to the present by great difficulties. Of course the applying of the silver-solution may be effected in any suitable manner.

An especially important advantage of the process described will be seen in the fact that mirrors, the layer of which is damaged or destroyed in any way, can be coated again without necessitating a second grinding of the plate. Mirrors to be provided with cut edges, facets or the like, were, up to the present, ground after mirroring. Now the present process also allows the subsequent mirroring of the object ground, because the silver layer can be distributed over the entire surface and also over the edges of the same.

What I claim is:

The process for mirroring glass or like surfaces which consists in applying a solution of a silver salt and an alkaline or a reducing substance of no mirroring quality to the surface to be mirrored and in precipitating the silver by a subsequent action of a reducing or alkaline substance, substantially as and for the purpose specified.

In testimony, that I claim the foregoing as my invention, I have signed my name in presence of two witnesses, this second day of July, 1908.

CARL HERMANN VON HOESSLE.

Witnesses:
GEORG HEUSSINGER,
CLÄRE SIMON.